US012018518B2

(12) United States Patent
Estrada et al.

(10) Patent No.: US 12,018,518 B2
(45) Date of Patent: Jun. 25, 2024

(54) VEHICLE LATCH

(71) Applicant: Inteva Products, LLC, Troy, MI (US)

(72) Inventors: Eduardo Estrada, Chihuahua (MX); Manuel Escamilla, Chihuahua (MX); Donald M. Perkins, Sterling Heights, MI (US)

(73) Assignee: INTEVA PRODUCTS, LLC, Troy, MI (US)

(*) Notice: Subject to any disclaimer, the term of this patent is extended or adjusted under 35 U.S.C. 154(b) by 215 days.

(21) Appl. No.: 17/074,032

(22) Filed: Oct. 19, 2020

(65) Prior Publication Data

US 2021/0032913 A1 Feb. 4, 2021

Related U.S. Application Data

(62) Division of application No. 15/589,148, filed on May 8, 2017, now Pat. No. 10,808,435.

(60) Provisional application No. 62/430,854, filed on Dec. 6, 2016.

(51) Int. Cl.

*E05B 81/90* (2014.01)
*E05B 81/20* (2014.01)
*E05B 81/06* (2014.01)
*E05B 81/14* (2014.01)

(52) U.S. Cl.

CPC .............. *E05B 81/90* (2013.01); *E05B 81/20* (2013.01); *E05B 81/06* (2013.01); *E05B 81/15* (2013.01)

(58) Field of Classification Search

CPC .......... E05B 81/20; E05B 81/90; E05B 81/06; E05B 77/265; E05B 81/15

See application file for complete search history.

(56) References Cited

U.S. PATENT DOCUMENTS 6,125,583 A * 10/2000 Murray ................. E05F 15/638 49/360
6,398,271 B1 * 6/2002 Tomaszewski ......... E05B 81/25 292/201
2003/0155779 A1 * 8/2003 Belmond ........... G07C 9/00309 292/216
2006/0055181 A1 * 3/2006 Berghahn ................ E05B 81/20 292/216
2007/0029814 A1 2/2007 Coleman et al.

(Continued)

OTHER PUBLICATIONS

U.S. Final Office Action; U.S. Appl. No. 15/589,148, filed May 8, 2017; Date of Mailing: Mar. 20, 2020; 11 pages.

(Continued)

*Primary Examiner* — Mark A Williams
(74) *Attorney, Agent, or Firm* — CANTOR COLBURN LLP

(57) ABSTRACT

A latch includes a housing, a fork bolt operably coupled to the housing and pivotal between an unlatched position, a primary latched position, and a secondary latched position, and a detent lever operably coupled to the housing and arranged to cooperate with the fork bolt. A drive link is operatively connected to the fork bolt and to the detent lever. An override lever is operably coupled to the drive link. A manual release lever is operably coupled to the override lever. The manual release lever is movable between a rest position and a release position. The drive link is automatically moved out of a path of rotation of the fork bolt when the manual release lever is moved to the release position.

3 Claims, 12 Drawing Sheets

REST POSITION

(56) References Cited

U.S. PATENT DOCUMENTS

| | | | | |
|---|---|---|---|---|
| 2010/0052336 | A1 | 3/2010 | Bendel et al. | |
| 2010/0052341 | A1 | 3/2010 | Taurasi et al. | |
| 2011/0107800 | A1* | 5/2011 | Barbier | E05B 77/28 70/237 |
| 2011/0210565 | A1* | 9/2011 | Scholz | E05B 85/26 292/200 |
| 2012/0091740 | A1 | 4/2012 | Chevalier et al. | |
| 2012/0313384 | A1* | 12/2012 | Cumbo | E05B 81/14 292/199 |
| 2013/0270840 | A1* | 10/2013 | Lujan | E05C 19/12 292/96 |
| 2014/0091581 | A1 | 4/2014 | Taurasi et al. | |
| 2015/0048629 | A1 | 2/2015 | Terricabras et al. | |
| 2016/0017644 | A1* | 1/2016 | Okuma | E05B 81/20 292/201 |
| 2016/0186468 | A1* | 6/2016 | Ilea | E05B 81/20 292/201 |
| 2018/0044950 | A1* | 2/2018 | Distefano | E05B 85/26 |
| 2018/0087298 | A1* | 3/2018 | Strole | B62D 33/037 |
| 2018/0155965 | A1* | 6/2018 | Estrada | E05B 81/20 |

OTHER PUBLICATIONS

U.S. Non-Final Office Action; U.S. Appl. No. 15/589,148, filed May 8, 2017; Date of Mailing: Sep. 9, 2019; 11 pages.

* cited by examiner

REST POSITION

REST POSITION / SECTION

RELEASE POSITION AND OVERRIDE

RELEASE POSITION AND OVERRIDE / SECTION

VEHICLE LATCH

CROSS-REFERENCE TO RELATED APPLICATIONS

This application is a division of U.S. patent application Ser. No. 15/589,148 filed May 8, 2017, which claims the benefit of U.S. Provisional Patent Application Ser. No. 62/430,854 filed Dec. 6, 2016, the entire contents of which are incorporated herein by reference.

TECHNICAL FIELD

Exemplary embodiments of the present invention relate generally to door, lift gate, glass window and movable panel latches and, more particularly, to latches for vehicles.

BACKGROUND

Certain passenger vehicles are equipped with a rear vehicle storage compartment, commonly known as a trunk. The trunk is closed by a deck lid that is hinged to the vehicle body and swings open to provide access to the storage compartment. Similarly, other vehicles are equipped with a lift gate that allows access to the rear of the vehicle through a gate that is hinged at or near the roof line of a vehicle and opens upward. Other vehicles have sliding doors that run horizontally on a track between an opened and closed position. Each of the deck lid, lift gate or sliding door can be thought of as panels that allow access to the interior of the vehicle compartment. Compartment latches, enable each of these types of panels to be secured and closed.

Latches may be configured to perform both a power release function and a power cinching function. During a cinching operation, a cinching motor commonly moves a gear transmission that in turn rotates the forkbolt. During a release operation, a release mechanism rotates the detent position allowing the forkbolt to rotate open. The same motor may be configured to perform both the power release and the power cinching function; however such configurations typically include a multitude of structural components, which vary between latch applications.

Accordingly, while existing vehicle latch mechanisms are suitable, the need for improvement remains, particularly in providing a compactly packaged latch assembly having a reduced number of components such that a single motor is configured to perform both a power release and power cinching operation.

SUMMARY OF THE INVENTION

In accordance with an embodiment, a latch includes a housing, a fork bolt operably coupled to the housing and pivotal between an unlatched position, a primary latched position, and a secondary latched position, and a detent lever operably coupled to the housing and arranged to cooperate with the fork bolt. A drive link is operatively connected to the fork bolt and to the detent lever. An override lever is operably coupled to the drive link. A manual release lever is operably coupled to the override lever. The manual release lever is movable between a rest position and a release position. The drive link is automatically moved out of a path of rotation of the fork bolt when the manual release lever is moved to the release position.

In addition to one or more of the features described above, or as an alternative, in further embodiments the override lever translates relative to the housing between a first position and a second position in response to movement of the manual release lever between the rest position and the release position.

In addition to one or more of the features described above, or as an alternative, in further embodiments the drive link further comprises a guide pin and the override lever cooperates with the guide pin to move the drive link relative to the path of rotation of the fork bolt.

In addition to one or more of the features described above, or as an alternative, in further embodiments when the manual release lever is in the rest position, the drive link is arranged within the path of rotation of the fork bolt.

In addition to one or more of the features described above, or as an alternative, in further embodiments override lever includes a contoured surface and the manual release lever includes a cam surface arranged generally adjacent the contoured surface.

In addition to one or more of the features described above, or as an alternative, in further embodiments when the manual release lever is in the rest position, the cam surface and the contoured surface are generally complementary and aligned.

In addition to one or more of the features described above, or as an alternative, in further embodiments when the manual release lever is in the release position, the cam surface is rotated relative to the contoured surface such that cam surface applies a force to the contoured surface.

According to another embodiment, a method of operating a latch includes operatively coupling a drive link with a fork bolt and a detent lever, associating a manual release lever with an override lever, moving the manual release lever in a first direction to engage the detent lever, and moving the drive link out of a path of rotation of the fork bolt to open the latch.

In addition to one or more of the features described above, or as an alternative, in further embodiments comprising moving the override lever between a first position and a second position in response to moving the manual release lever in a first direction.

In addition to one or more of the features described above, or as an alternative, in further embodiments moving the manual release lever includes rotating a cam surface of the manual release lever into engagement with a contoured surface of the override lever.

In addition to one or more of the features described above, or as an alternative, in further embodiments the override lever is operably coupled to the drive link such that moving the override lever between the first position and the second position applies a force to the drive link to move the drive link out of the path of rotation of the fork bolt.

According to yet another embodiment, a latch includes a housing, a fork bolt operably coupled to the housing and pivotal between an unlatched position, a primary latched position, and a secondary latched position, and a detent lever operably coupled to the housing and arranged to cooperate with the fork bolt. A drive link is operatively connected to the fork bolt and to the detent lever, the drive link being movable to engage the detent lever to open the latch. A hold over lever is operably coupled to the housing. The hold open lever is movable to selectively engage the detent lever to restrict movement of the detent lever into engagement with the fork bolt.

In addition to one or more of the features described above, or as an alternative, in further embodiments the hold open lever is rotated between a rest position and an actuated position.

In addition to one or more of the features described above, or as an alternative, in further embodiments when the hold open lever is in the rest position, a first surface of a distal end of the hold open lever is arranged in contact with a portion of the detent lever.

In addition to one or more of the features described above, or as an alternative, in further embodiments when the hold open lever is in the actuated position, a second surface of the distal end of the hold open lever is arranged in contact with the portion of the detent lever.

In addition to one or more of the features described above, or as an alternative, in further embodiments the drive link is operable to engage and apply a force to the hold open lever to move the hold open lever from the actuated position to the rest position.

In addition to one or more of the features described above, or as an alternative, in further embodiments the hold open lever is biased into the actuated position by a biasing mechanism.

According to another embodiment, a method of operating a latch includes mounting a fork bolt and a detent lever to a housing such that the fork bolt and detent cooperate to open and close the latch, mounting a hold open lever such that a distal end of the hold open lever is arranged adjacent a portion of the detent lever, moving the detent lever out of engagement with the fork bolt, and moving the hold open lever to retain the detent lever in a position disengaged with fork bolt such that the fork bolt is rotatable about an axis to an unlatched position.

In addition to one or more of the features described above, or as an alternative, in further embodiments comprising providing a single input to the latch to move the detent lever out of engagement with the fork bolt.

In addition to one or more of the features described above, or as an alternative, in further embodiments the fork bolt is movable to the unlatched position in response to the single input.

The above-described and other features and advantages of the present invention will be appreciated and understood by those skilled in the art from the following detailed description, drawings, and appended claims.

BRIEF DESCRIPTION OF THE DRAWINGS

Embodiments of the present invention will now be described, by way of example only, with reference to the accompanying drawings in which.

Although the drawings represent varied embodiments and features of the present invention, the drawings are not necessarily to scale and certain features may be exaggerated in order to illustrate and explain exemplary embodiments the present invention. The exemplification set forth herein illustrates several aspects of the invention, in one form, and such exemplification is not to be construed as limiting the scope of the invention in any manner.

DETAILED DESCRIPTION

Figure 1:
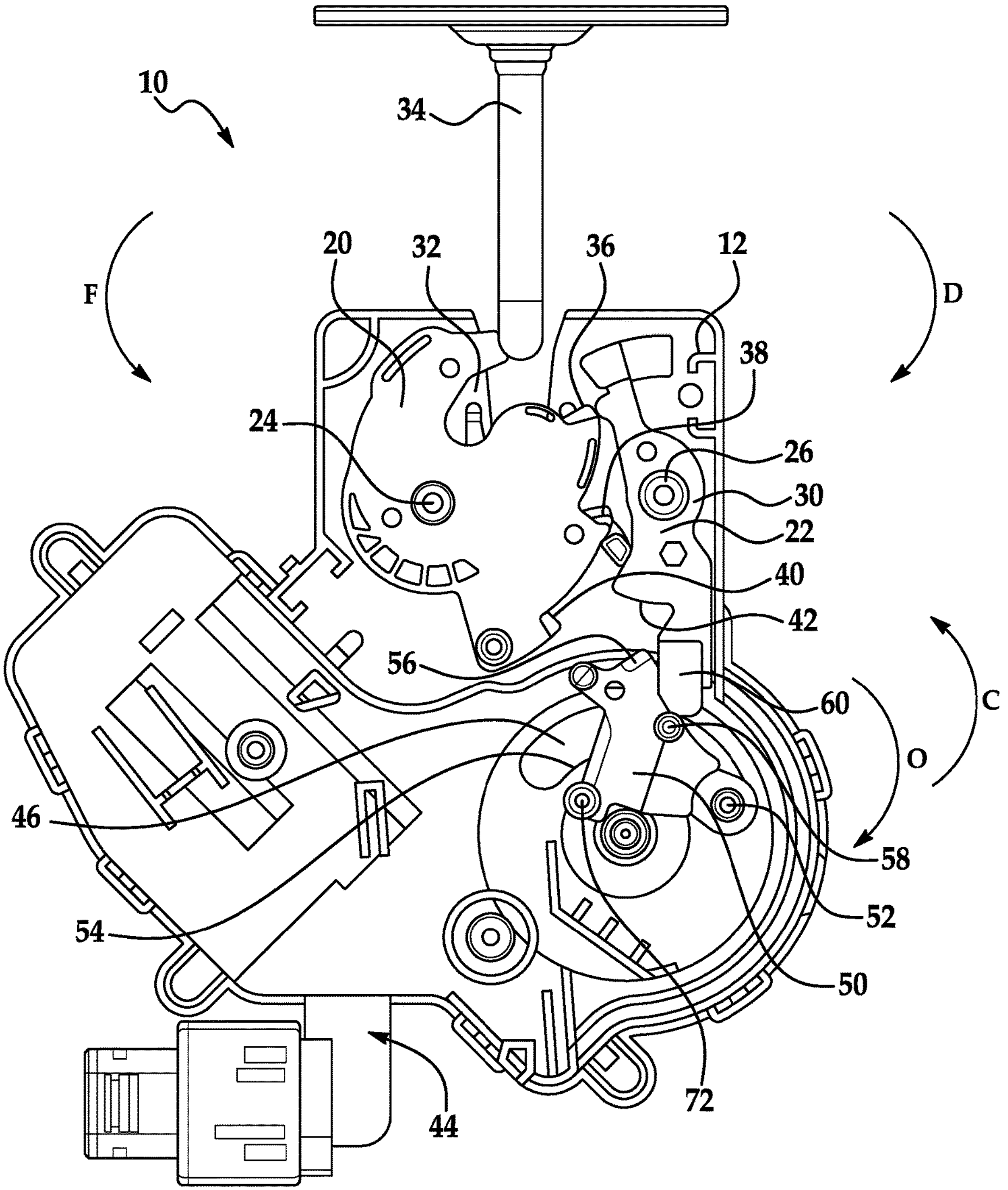
FIG. 1 is an illustration of a portion of a latch in a release position according to an embodiment.

Referring now to the FIGS., an example of a latch 10 is illustrated. The latch 10 is movable between at least one latched position (FIG.) and an unlatched position (FIG. 1) and includes a housing or plate 12. In one embodiment, the latch or latch assembly 10 may be a vehicle door latch. Latch 10 may be configured to keep a vehicle door latched. Still further the latch 10 can be used with any vehicle door or movable component that needs to be latched and unlatched with respect to the vehicle.

As mentioned above, the latch 10 is applicable to any environment where the features of various embodiments of the invention are desired. For example, the latch assembly 10 can be attached to a vehicle structure such that the fork bolt is moved between the open position and the closed position when a door, window, lift gate, hood, etc. is opened and closed and the fork bolt engages a striker that is attached to the door, window, lift gate, hood etc. Alternatively, the latch 10 or latch assembly 10 can be secured to the door, window, lift gate, hood etc. and the striker is secured to the vehicle body at an opening into which the door, window, lift gate, hood etc. is received The latch 10 includes a fork bolt 20, also commonly referred to as a claw, and a cooperating detent lever or pawl 22 for maintaining the fork bolt 20 in the latched position. Each of the fork bolt 20 and the detent lever 22 are pivotally mounted to the housing 12. In one non-limiting embodiment, the fork bolt 20 is capable of rotation about first stud or pin 24, while detent lever or pawl 22 is a capable of rotation about a second stud or pin 26. The fork bolt 20 has a slot or throat 32 for receiving and retaining a striker 34, such as a wire-loop striker for example, located on a complementary vehicle component, such as a lift gate for example.

Figure 3:
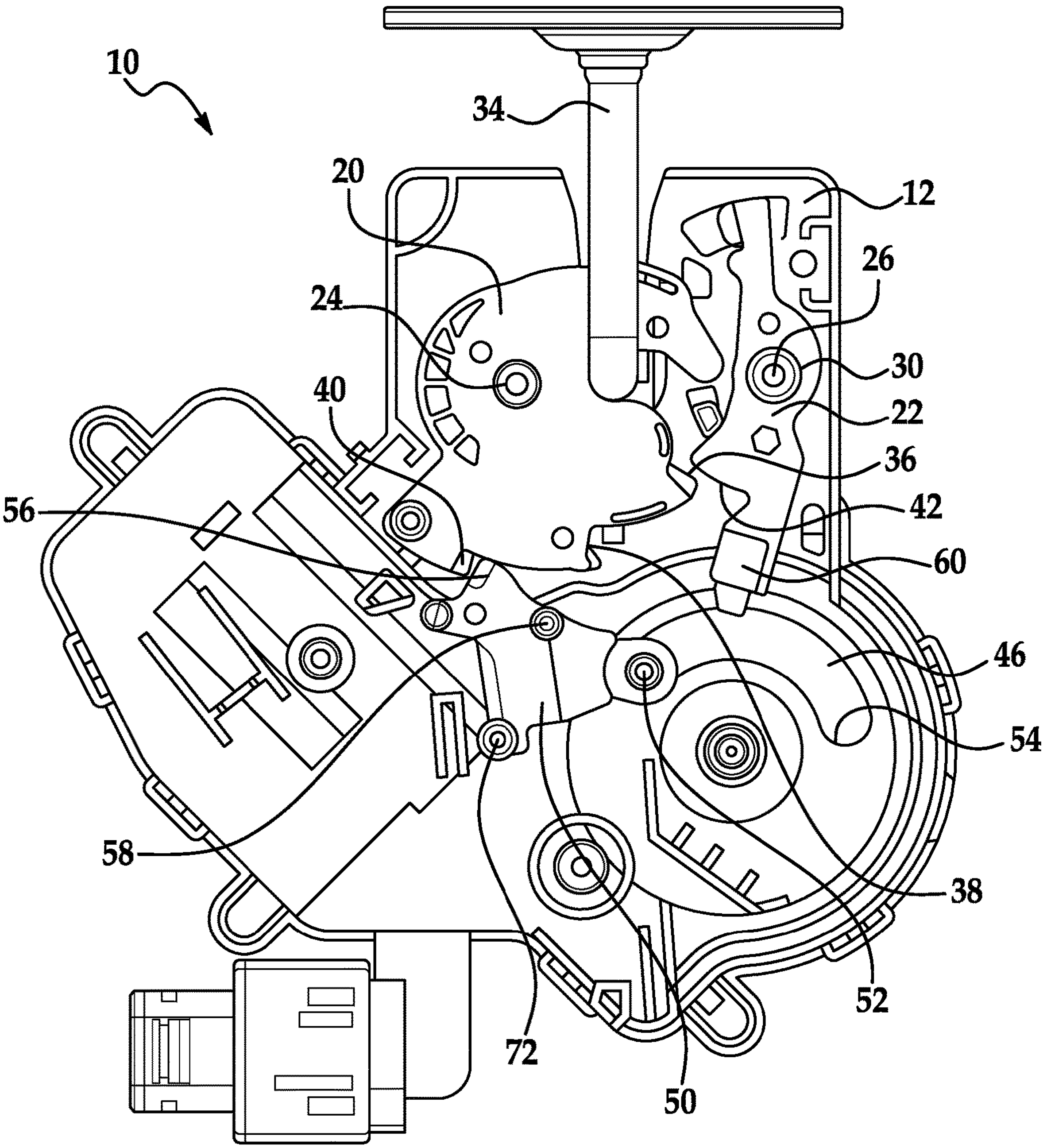
FIG. 3 is an illustration of a portion of a latch after a cinching operation according to an embodiment.
Figure 9:
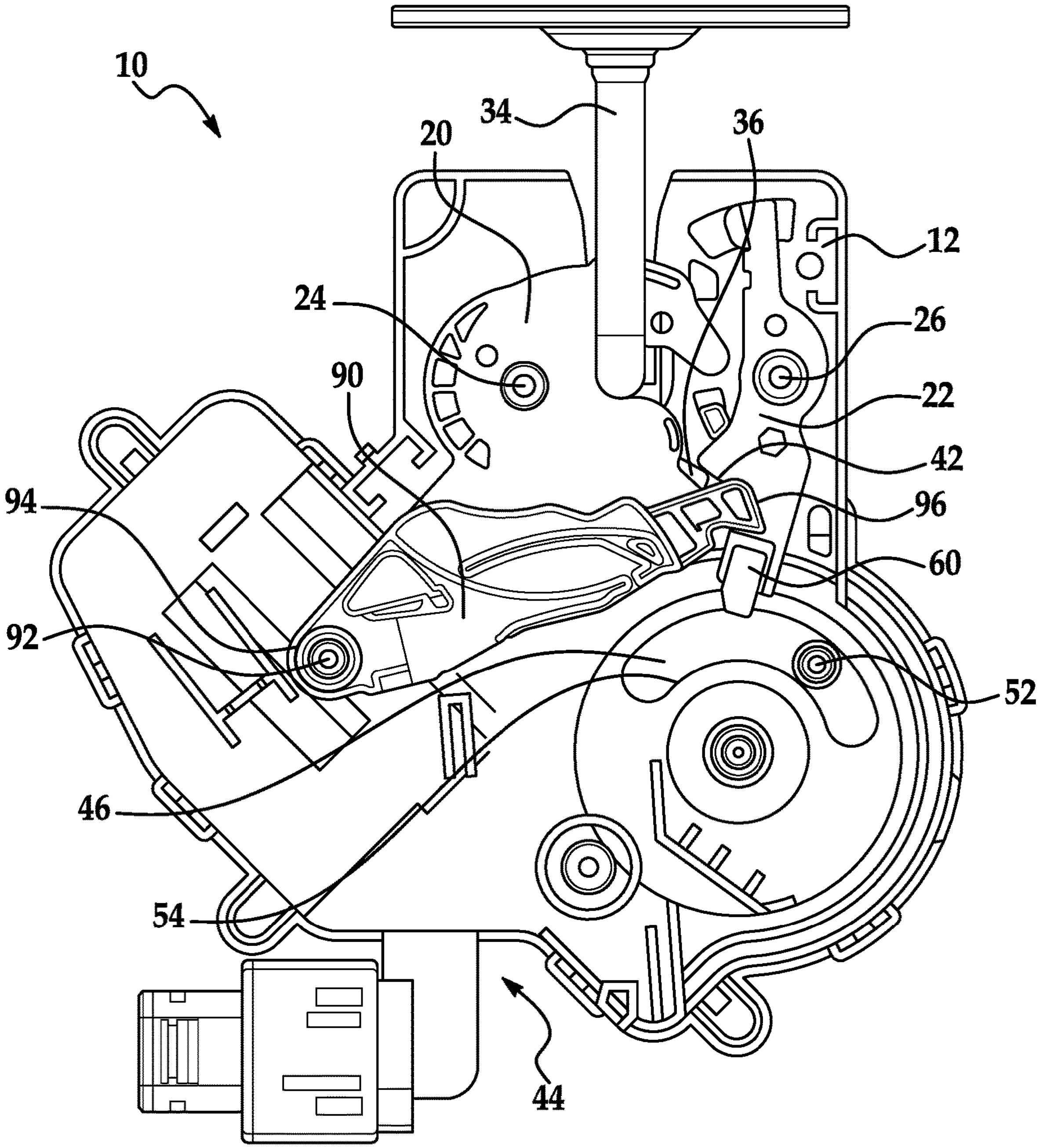
FIG. 9 is an illustration of a portion of a latch in a primary latched position according to an embodiment.
Figure 10:
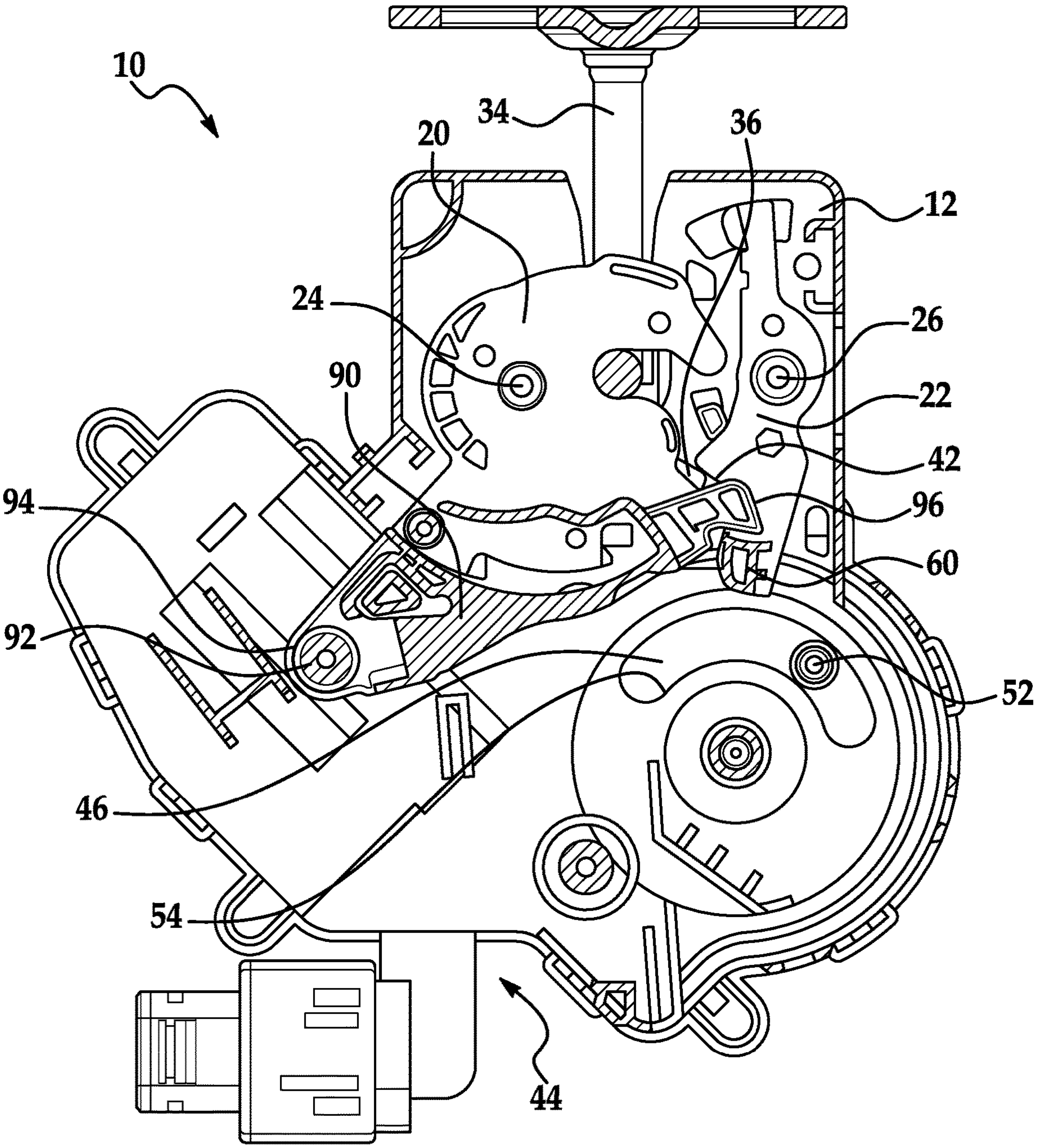
FIG. 10 is an illustration view of a portion of a latch in a primary latched position according to an embodiment.
Figure 11:
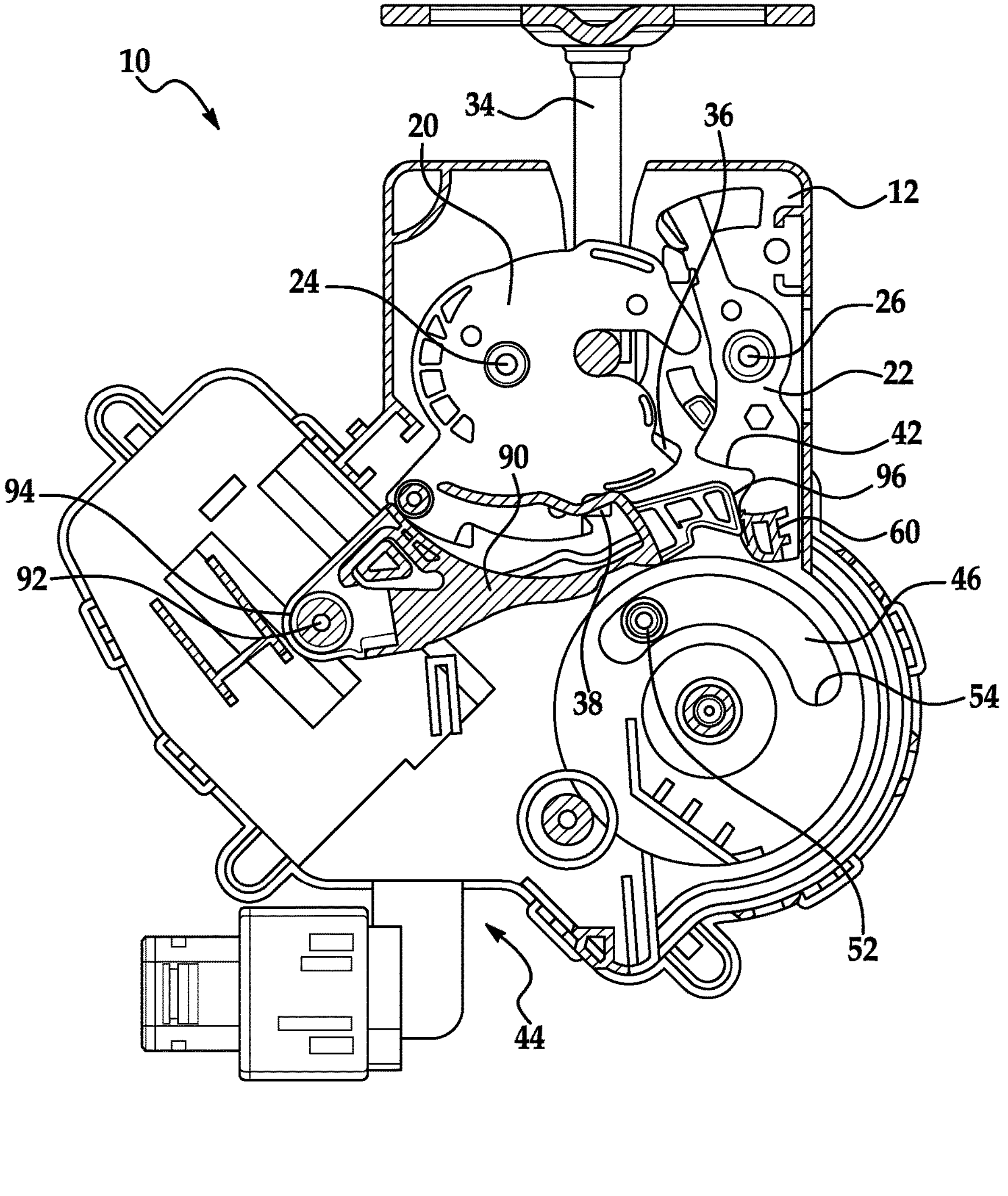
FIG. 11 is a schematic illustration of a portion of a latch in a hold open position according to an embodiment.

In accordance with an exemplary embodiment, the fork bolt 20 is capable of movement between a first or latched position or closed position (see at least FIGS. 3 and 9) wherein the striker 34 is engaged by the throat 32 of the fork bolt 20 and a second or open position (see at least FIGS. 1 and 12) wherein the striker 34 is free to be released from the throat 32 of the fork bolt 20. The housing 12 of the latch 10 will also have a complimentary opening for receipt of the striker 34 therein when it is engaged or latched by the fork bolt 20. In one non-limiting embodiment, the fork bolt 20 may be spring biased into the second or open position by a spring or biasing member, illustrated at 28.

Alternatively or in addition to the spring biasing force applied to the fork bolt 20, the movable member to which the striker 34 is secured may also be spring biased or biased into an open position such that when the latch 10 is released, the fork bolt 20 will rotate about its axis to release the striker 34. One non-limiting example of an item providing such a force is the compressed weather stripping or sealing member located around the periphery of the opening that is covered by the movable member. In other words, when the door is closed, the sealing member is compressed and the latch 10 engages the striker. Thereafter and when the latch 10 is released, the sealing member may provide an urging force to open the door or gate, etc.

As is known in the related arts, the detent 22 when in an engaged or latched position retains the fork bolt 20 in the primary or latched position. In order to allow the fork bolt 20 to rotate into an open or unlatched position, the detent 22 must be moved or rotated from the engaged position or latched position to a disengaged position or a released position wherein the detent 22 no longer block rotational movement of the fork bolt 20. In one embodiment, the detent 22 is spring biased into the engaged or latched position, such as via a biasing mechanism illustrated at 30.

In the illustrated, non-limiting embodiment, the fork bolt 20 includes a primary shoulder 36, a secondary shoulder 38, and a cinching shoulder 40. However, embodiments where the fork bolt 20 includes a plurality of additional shoulders are also within the scope of the disclosure. The primary shoulder 36 of the fork bolt 20 is configured to contact a corresponding surface of the detent lever 22 when rotating between an unlatched and a latched position. The detent lever 22 includes a sector-shaped catch 42 configured to positively engage the primary shoulder 36 (in a primary position), or alternatively, the secondary shoulder 38 (in a secondary position) to hold the fork bolt 20 against the bias of the first biasing mechanism 28.

Figure 4:
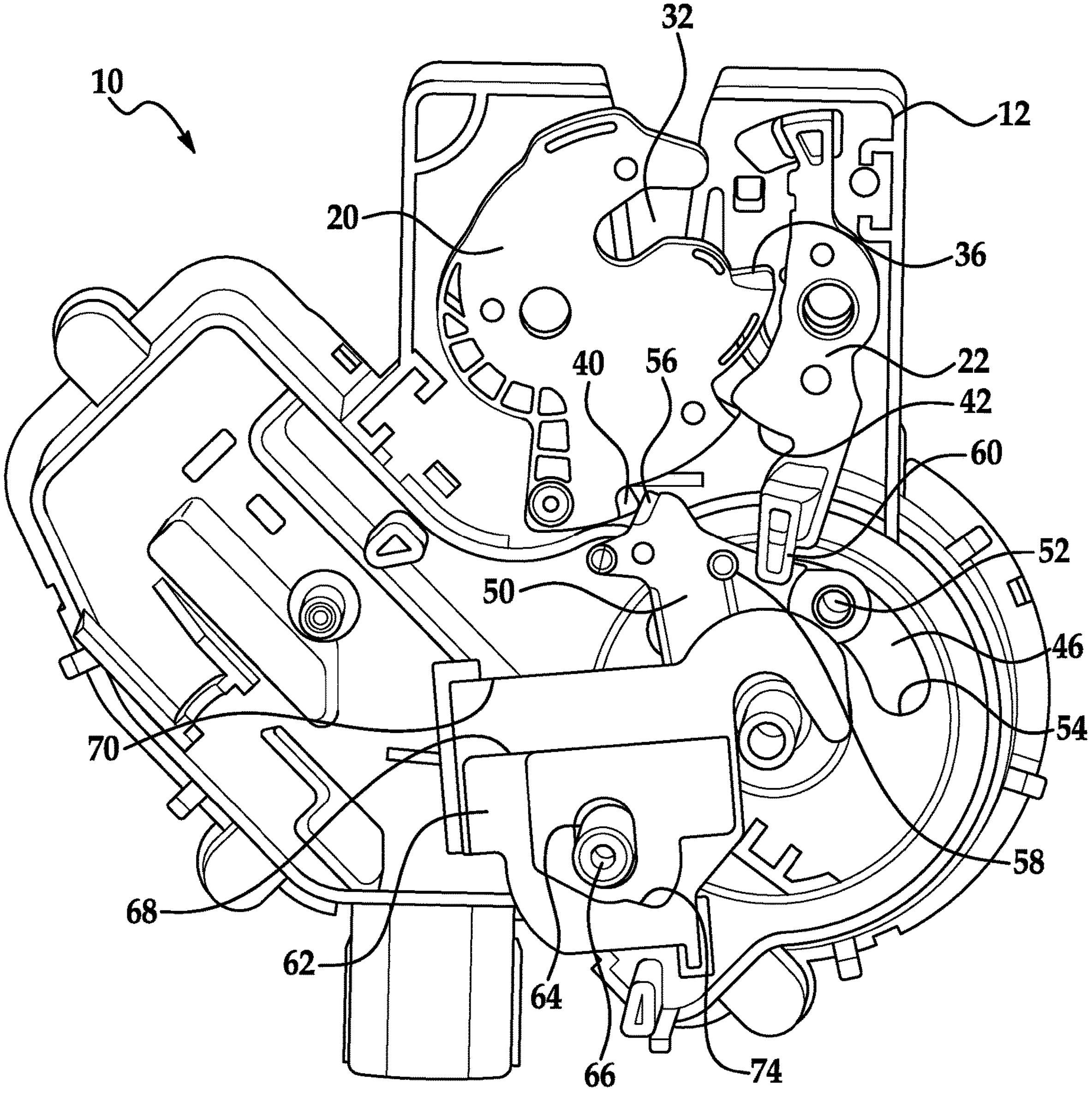
FIG. 4 is an illustration of an override lever of a latch according to an embodiment.
Figure 5:
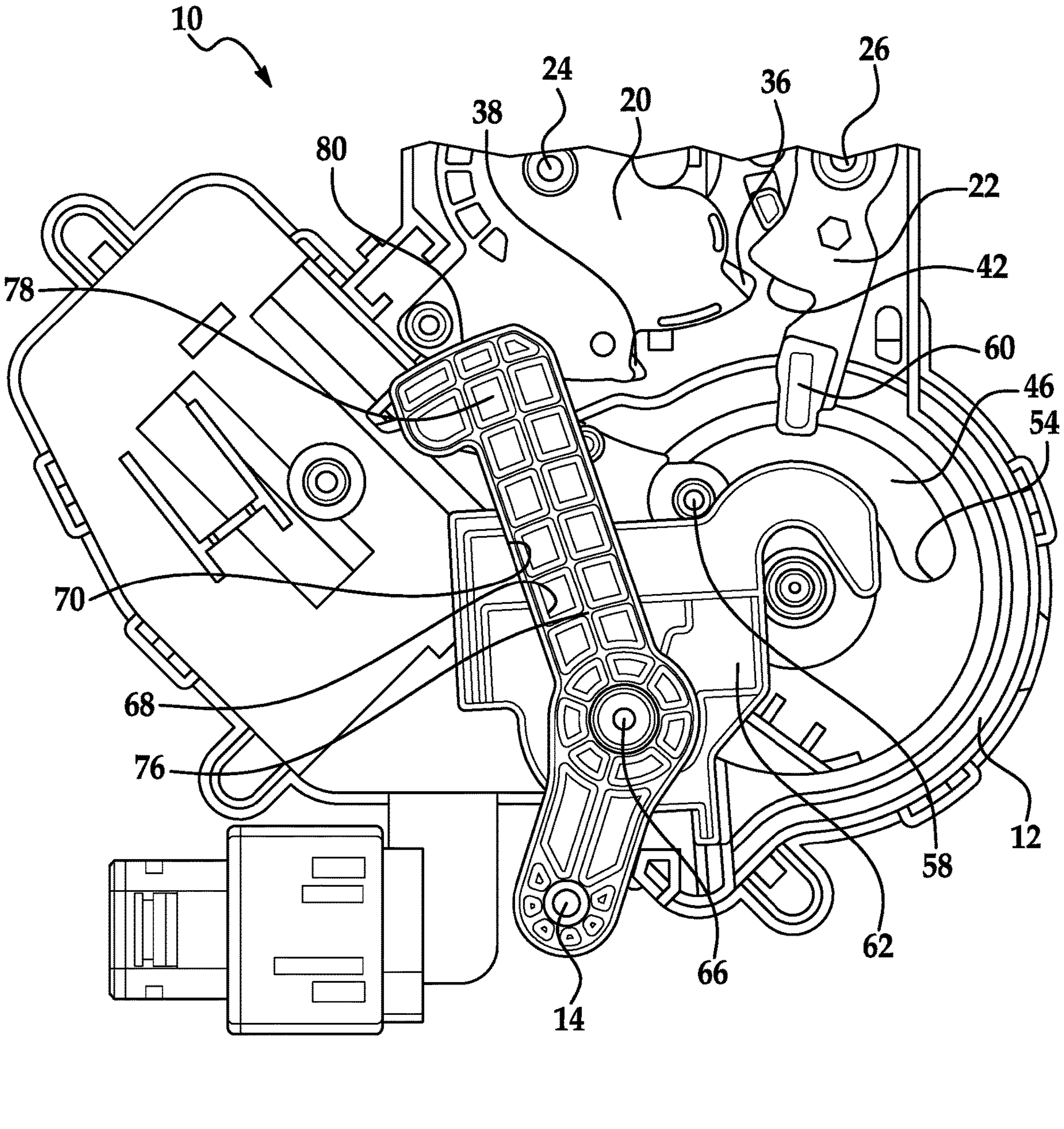
FIG. 5 is an illustration of an override lever and manual release lever of the latch in a rest position, according to an embodiment.

The latch 10 additionally includes an automatic mechanism 44 configured to selectively open the latch 10 and to cinch the latch 10 closed. In an embodiment, the automatic mechanism 44 includes a motor, illustrated schematically at M, having a gear, such as a worm coupled to the motor shaft. The gear is engaged with and configured to drive rotation of an adjacent gear 46, such as a rotary gear (best shown in FIG. 4) for example, about an axis. The automatic mechanism 44 illustrated and described herein is intended as an example only and other mechanisms, including other gear train configurations, are considered within the scope of the disclosure.

A drive link 50 mounted within the housing 12 is associated with the automatic mechanism 44. A first end 52 of the drive link 50, as best shown in FIGS., is connected to the rotary gear 46 and is movable within an elongated slot 54 formed in the housing 12. The drive link 50 additionally includes a tooth 56 extending from a second end of the drive link 50 generally towards the fork bolt 20, and a contactor 58 arranged at a central portion of the drive link 50 configured to cooperate with an adjacent portion 60 of the detent lever 22.

In an embodiment, the automatic mechanism 44 drives the rotary gear 46 in a first direction to open the latch 10. For example, as the rotary gear 46 rotates about an axis in a first direction, indicated by arrow O, the drive link 50 moves along a predetermined path defined by the elongated slot 54. As the drive link 50 moves, the contactor 58 extending from the drive link 50 engages portion 60 of the detent lever 22, thereby applying a rotational force to the detent lever 22 in a direction opposite the direction indicated by arrow D. As a result, the biasing force of the first biasing mechanism 28 causes the fork bolt 20 to rotate in the direction indicated by arrow F, to release the striker 34 from within the throat 32.

Figure 2:
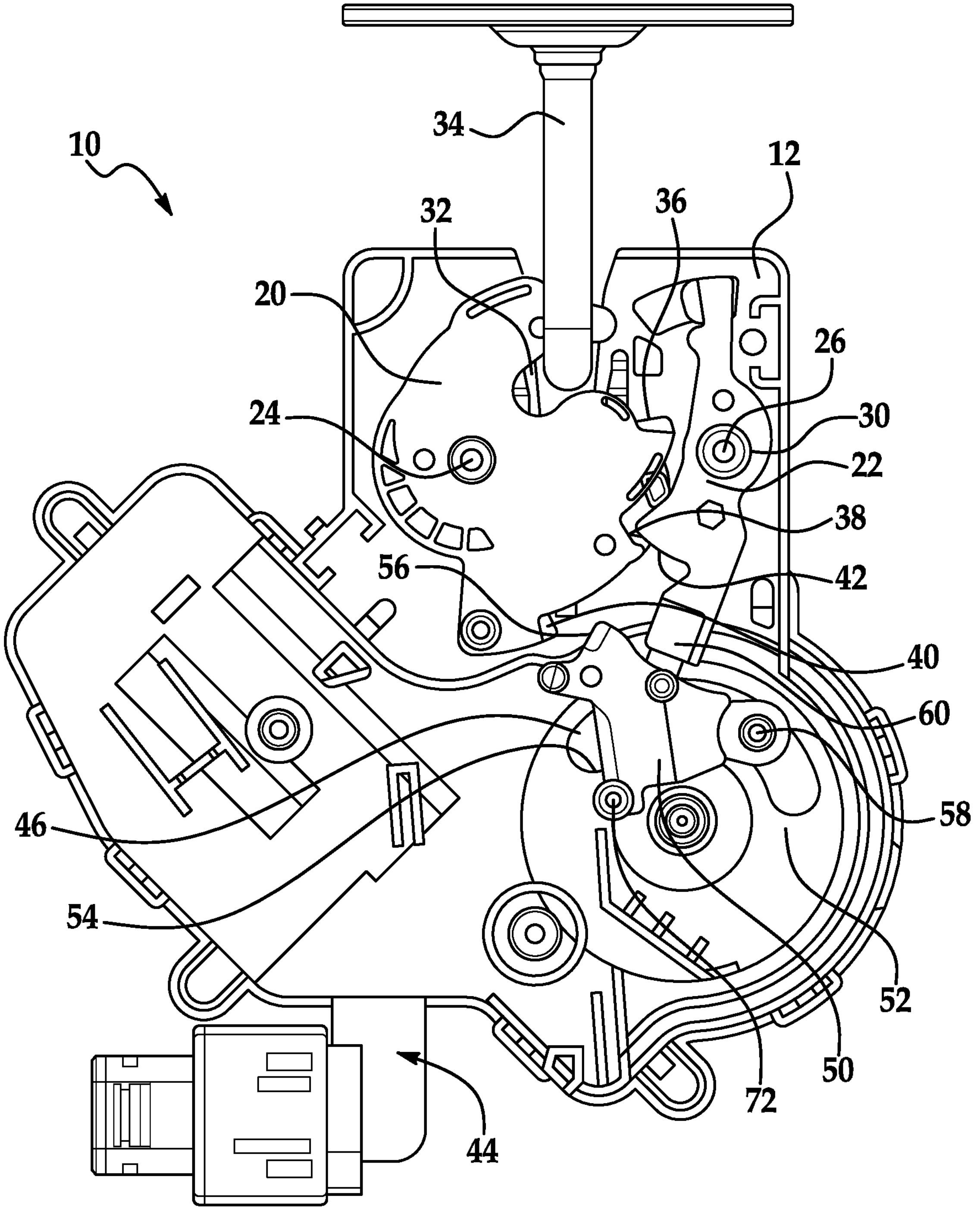
FIG. 2 is an illustration of a portion of a latch in a secondary latched position according to an embodiment.

When the latch 10 is partially closed, such as when the sector-shaped catch 42 of the detent lever 22 is engaged with the secondary shoulder 38 of the fork bolt 20, as shown in FIG. 2, the automatic mechanism 44 may be operated to cinch the latch 10 closed. In such embodiments, the rotary gear 46 is rotated about its axis in a second direction, indicated by arrow C. Rotation of rotary gear 46 causes a corresponding movement of the drive link 50 within the elongated slot 54. As the drive link 50 moves, the tooth 56 generally aligns with the cinching shoulder 40 (see FIG. 3). Further rotation of the rotary gear 46 causes the drive link 50 to engage and apply a rotational force to the fork bolt 20, in a direction opposite the biasing force, via the engagement between the tooth 56 and cinching shoulder 40. Accordingly, the rotational force causes the fork bolt 20 to rotate about its axis until the sector-shaped catch 42 engages the primary shoulder 36 of the fork bolt 20, thereby retaining the latch 10 in a closed position.

In an embodiment, best shown in FIGS. 4-8, an override lever 62 is mounted in overlapping arrangement with the drive link 50. The override lever 62 includes an elongated opening 64 configured to receive a post 66 extending from the housing 12. The override lever 62 additionally includes a first ledge 68 and a second ledge 70 extending from the plane of the override lever 62 towards the housing. A guide pin 72 extending out of the plane of the drive link 50 is received between the first and second ledges 68, 70. Formed in the side of the override lever 62 facing away from the drive link and housing 12 is a contoured surface 74.

Figure 7:
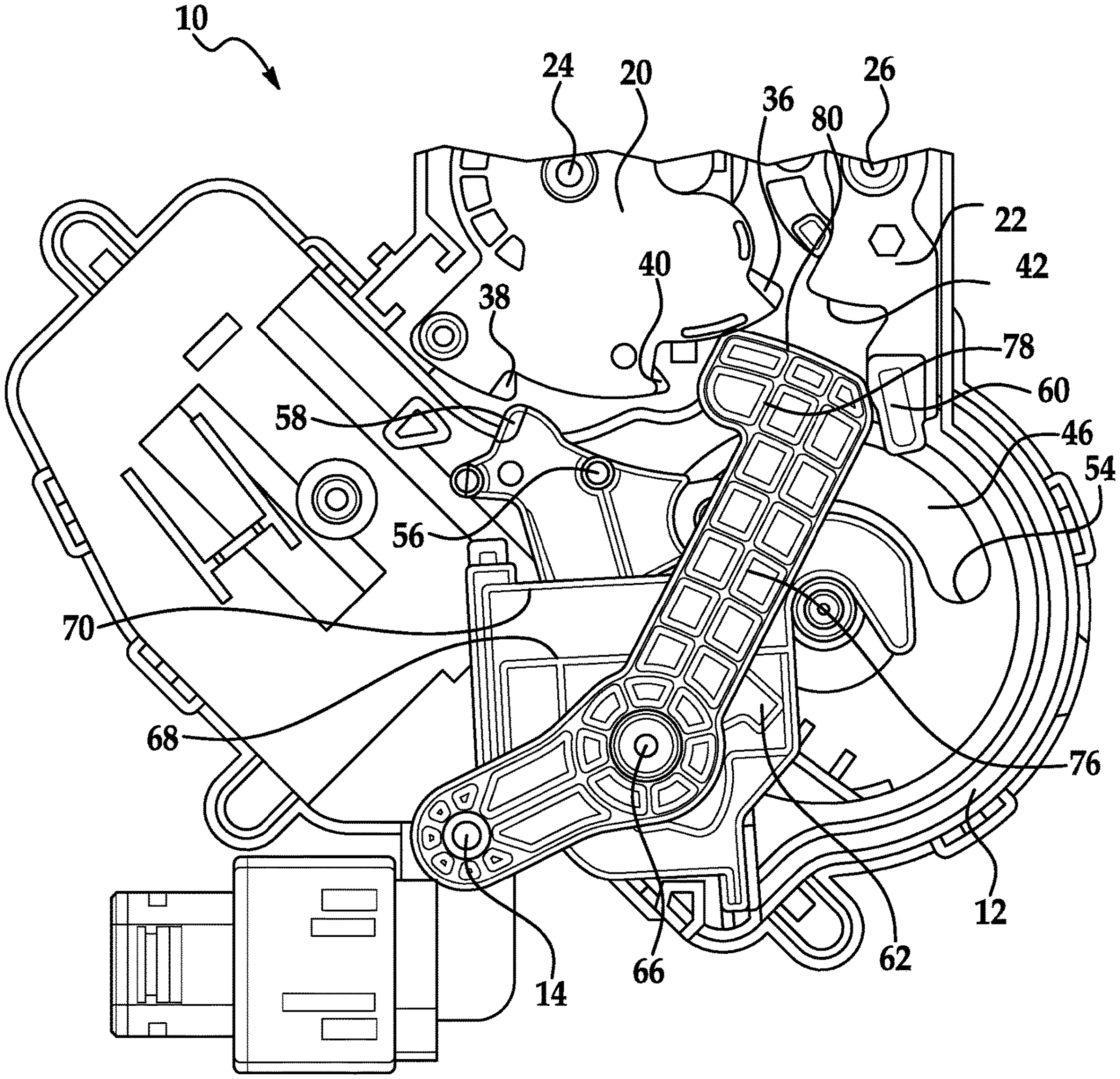
FIG. 7 is an illustration of the override lever and manual release lever of the latch in an actuated position, according to an embodiment.
Figure 8:
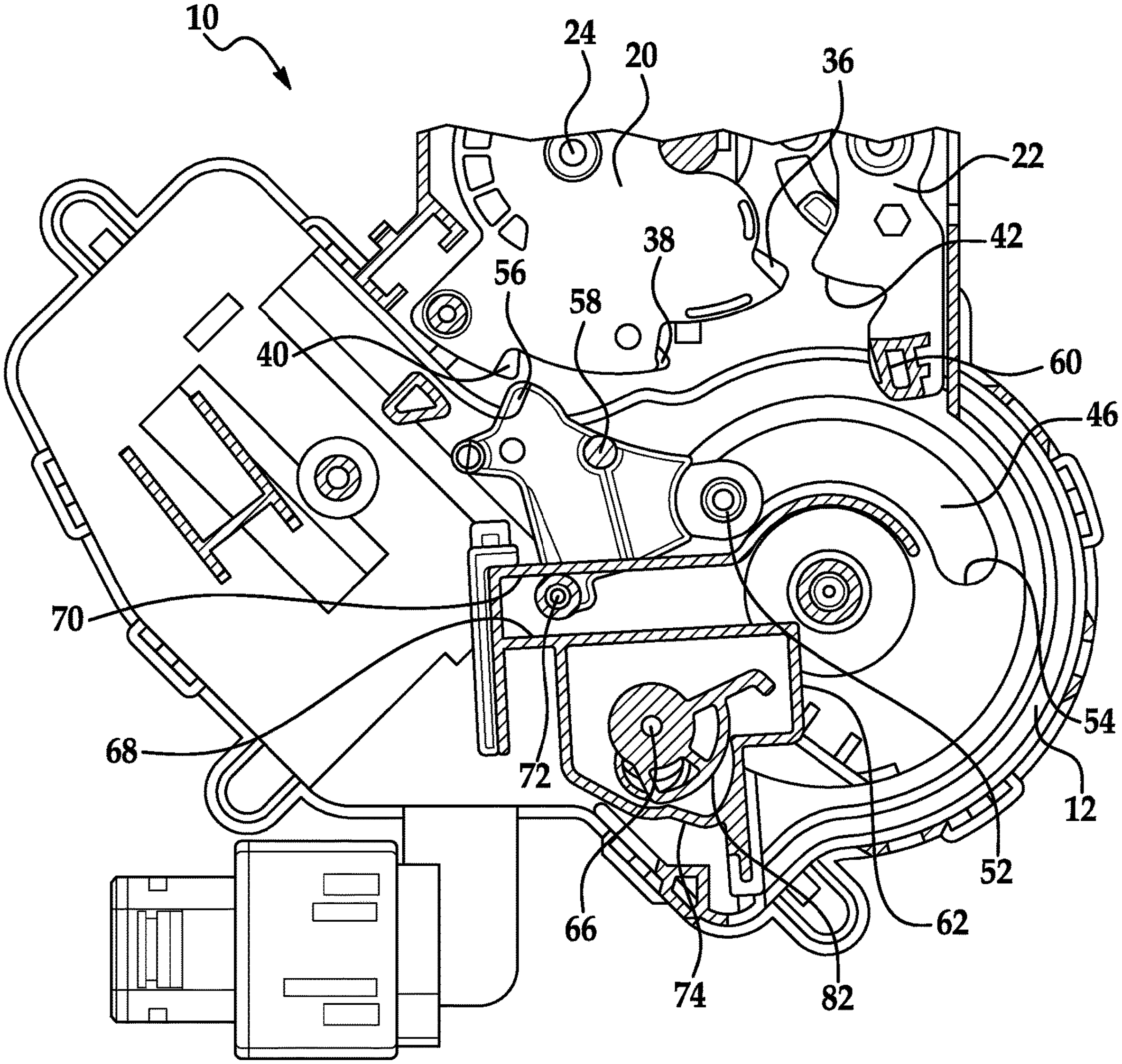
FIG. 8 is a schematic illustration of the override lever and the manual release lever of FIG. 7 in an actuated position, according to an embodiment.

A manual release lever 76 is mounted to the post 66 in overlapping arrangement with the override lever 62. A foot 78 arranged at an end 80 of the manual release lever 76 is positioned generally adjacent the forkbolt 20 or the detent lever 22. The manual release lever 76 is rotatable about the post 66 between a first position (FIG. 5) and a second position (FIG. 7). In the second position, the foot 78 is configured to engage portion 60 and pivot the detent 22 against its bias, out of engagement with the fork bolt 20. As a result, the biasing force of the first biasing mechanism 28 causes the fork bolt 20 to rotate in the direction indicated by arrow F, to release the striker 34 from within the throat 32.

Figure 6:
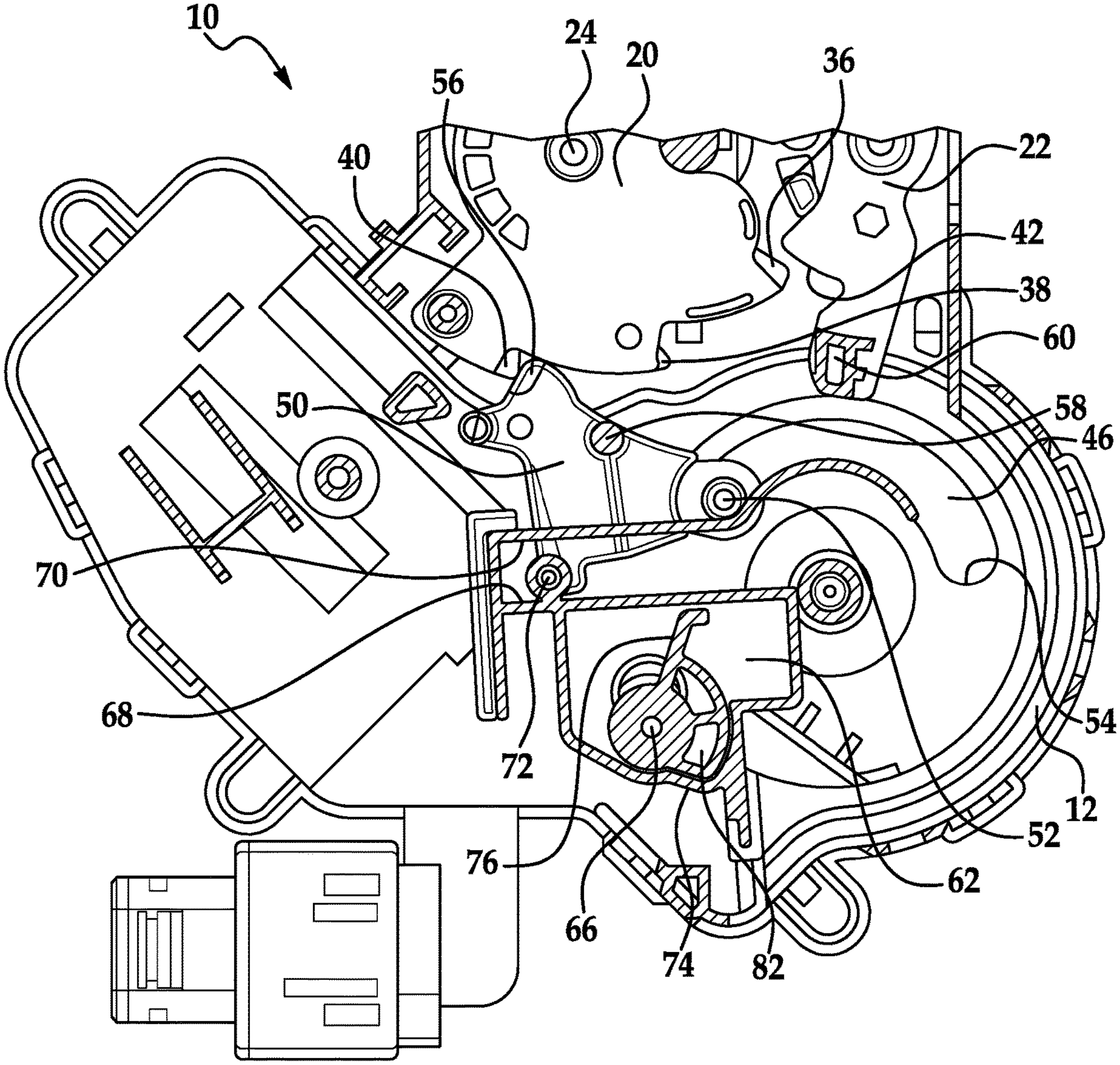
FIG. 6 is a schematic illustration of the override lever and the manual release lever of FIG. 5 in a rest position, according to an embodiment.

To ensure that the latch 10 opens in response to actuation of the manual release lever 76, rotation of the manual release lever 76 is configured to move the drive link 50 out of the path of rotation of the fork bolt 20. A cam surface 82 extends from a portion of the manual release lever 76. The cam surface 82 is configured to cooperate with the contoured surface 74 of the override lever 62 to cause the override lever 62 to translate relative to the post 66. As shown in FIG. 6, when the manual release lever 76 is in a first rest position such that the foot 78 is adjacent the fork bolt 20, the cam surface 82 is complementary to and generally aligned with the contoured surface 74. In addition, the override lever 62 is in a first position such that the guide pin 72 of the drive link 50 is generally positioned adjacent the first ledge 68 of the override lever 62.

In response to application of a force to a connector, illustrated schematically at H, operably coupled to the manual release lever 76, the manual release lever 76 is configured to pivot about the post 66 to the second release position. The engagement between the contoured surface 74 and the cam surface 82 as the manual release lever 76 rotates, best shown in FIG. 8, causes the override lever 62 to translate relative to the post 66 and the manual release lever 76. This movement of the override lever 62 applies a force to the guide pin 72, causing the drive link 50 to rotate about its first end 52, away from the fork bolt 20. When the override lever 62 is in the second position, the guide pin 72 is arranged in contact with the second ledge 70.

With reference now to FIGS. 9-12, the latch 10 may additionally include a hold open lever 90 configured to open the latch in response to a single actuation. The hold open lever 90 is rotatably mounted to the housing 12 with a stud or pin 92 and is biased by a biasing member 94 from a rest position towards a default position, shown in FIG. 11. In the rest position, the distal end 96 of the hold open lever 90 is arranged generally adjacent the catch 42 and portion 60 of the detent 22. In an embodiment, engagement of the distal end 96 and portion 60 opposes rotation of the hold open lever 90 in the biased direction.

When the detent 22 is rotated in a direction away from the forkbolt 20, the detent 22 moves out of engagement with the distal end 96 of the hold open lever 90. As a result, the biasing force of the biasing mechanism 94 causes the hold open lever 90 to pivot in the direction indicated by arrow L to a hold open position (see FIG. 11). Upon removal of the force applied to the detent 22, the detent 22 will bias toward the fork bolt 20 such that the distal end 96 of the hold open lever 90 contacts a surface of portion 60 to prevent the detent 22 from reengaging the forkbolt 20.

Figure 12:
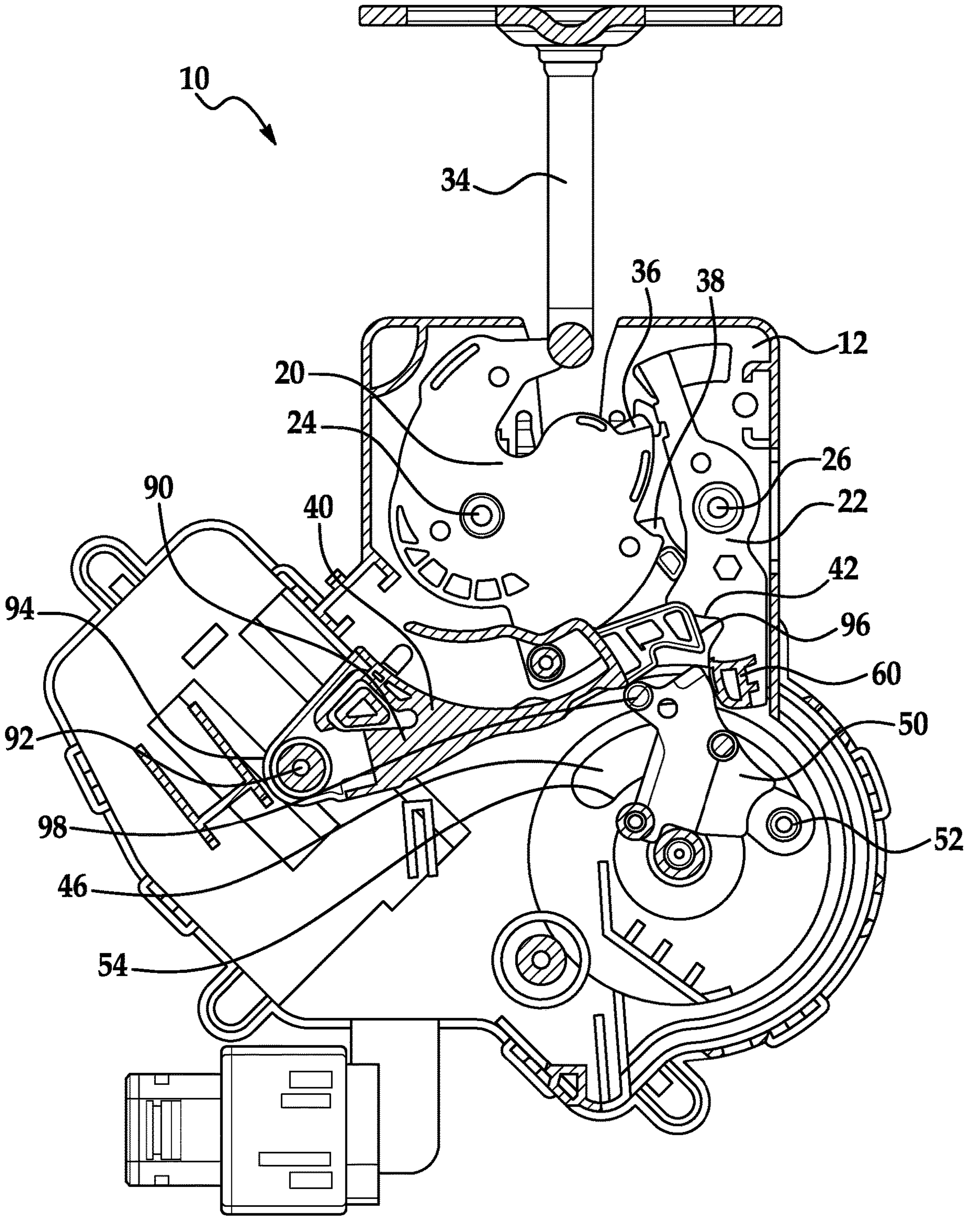
FIG. 12 is a schematic illustration of a portion of a latch in a hold open override position according to an embodiment.

To return the hold open lever 90 to its original position, the drive link 50 may be driven by automatic mechanism 44. As best shown in FIG. 12, when driven in a first direction, a portion 98 of the drive link 50 is configured to engage and apply a force to the hold open lever 90 opposite the biasing force of the biasing mechanism 94. In an embodiment, the contour of the drive link 50 is designed to simultaneously apply a force to the detent lever 22 in a direction opposite the biasing force of biasing mechanism 30. Accordingly, the detent lever is maintained in a disengaged position as the hold open lever is returned to its rest position. The detent lever 22 is then released to allow the catch 42 to engage a shoulder 36 or 38 of the fork bolt 20 and the portion 60 to engage the distal end of the hold open lever 90.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of operating a latch, the latch including a fork bolt, and a detent lever, the method comprising:

providing a drive link selectively engageable with the fork bolt and the detent lever;

providing an override lever movably mounted about a post, the override lever being operably coupled to the drive link;

providing a manual release lever mounted to the post, the manual release lever being rotatable relative to the post and the override lever, wherein the manual release lever is operably coupled to the override lever as the manual release lever rotates about the post;

rotating the manual release lever about the post into engagement with the detent lever;

pivoting the detent lever out of engagement with the fork bolt via rotation of the manual release lever about the post, wherein disengaging the detent lever from the fork bolt allows the fork bolt to rotate along a path of rotation to an unlatched position;

translating the override lever relative to the post and the manual release lever in response to rotation of the manual release lever about the post; and moving the drive link out of a path of rotation of the fork bolt in response to translating the override lever relative to the post, wherein the fork bolt is freely rotatable to an unlatched position when the fork bolt is disengaged from the detent lever and the drive link is separated from the path of rotation of the fork bolt.

2. The method of claim 1, wherein rotating the manual release lever includes rotating a cam surface of the manual release lever into engagement with a contoured surface of the override lever.

3. The method of claim 2, wherein the override lever is operably coupled to the drive link such that translating the override lever applies a force to the drive link to move the drive link out of the path of rotation of the fork bolt.

* * * * *